United States Patent [19]
Shank, Jr.

[11] 3,816,221
[45] June 11, 1974

[54] WRAP AROUND DECORATION APPLYING APPARATUS

[75] Inventor: Herbert Shank, Jr., Lancaster, Ohio

[73] Assignee: Anchor Hocking Corporation, Lancaster, Ohio

[22] Filed: May 10, 1972

[21] Appl. No.: 252,045

[52] U.S. Cl.................. 156/492, 156/566, 156/572
[51] Int. Cl............................................. B65c 9/14
[58] Field of Search.................. 156/492, 486–489, 156/566–568, 572, 570; 53/348

[56] References Cited
UNITED STATES PATENTS

| | | | |
|---|---|---|---|
| 2,863,272 | 12/1958 | Shera | 53/348 |
| 3,108,033 | 10/1963 | Carter | 156/492 |
| 3,130,107 | 4/1964 | Shank | 156/570 X |
| 3,175,938 | 3/1965 | Moberg | 156/489 |
| 3,465,498 | 9/1969 | Sokol | 53/348 |
| 3,673,043 | 6/1972 | Carter | 156/489 X |

FOREIGN PATENTS OR APPLICATIONS
871,031   6/1961   Great Britain ..................... 156/492

Primary Examiner—Charles E. Van Horn
Assistant Examiner—David A. Simmons
Attorney, Agent, or Firm—Wood, Herron & Evans

[57] ABSTRACT

An apparatus for placing a decoration such as a decal, on a rounded article, for example a coffee mug, drinking glass, cup or the like. A picker removes a decal from a supply and extends to a position at which a portion of the decal is in contact with the exterior sidewall surface of the article to be decorated. Wrapper means mounted on the picket support are then energized to wrap the remaining portions of the decal into contact with the article sidewall surface.

10 Claims, 10 Drawing Figures

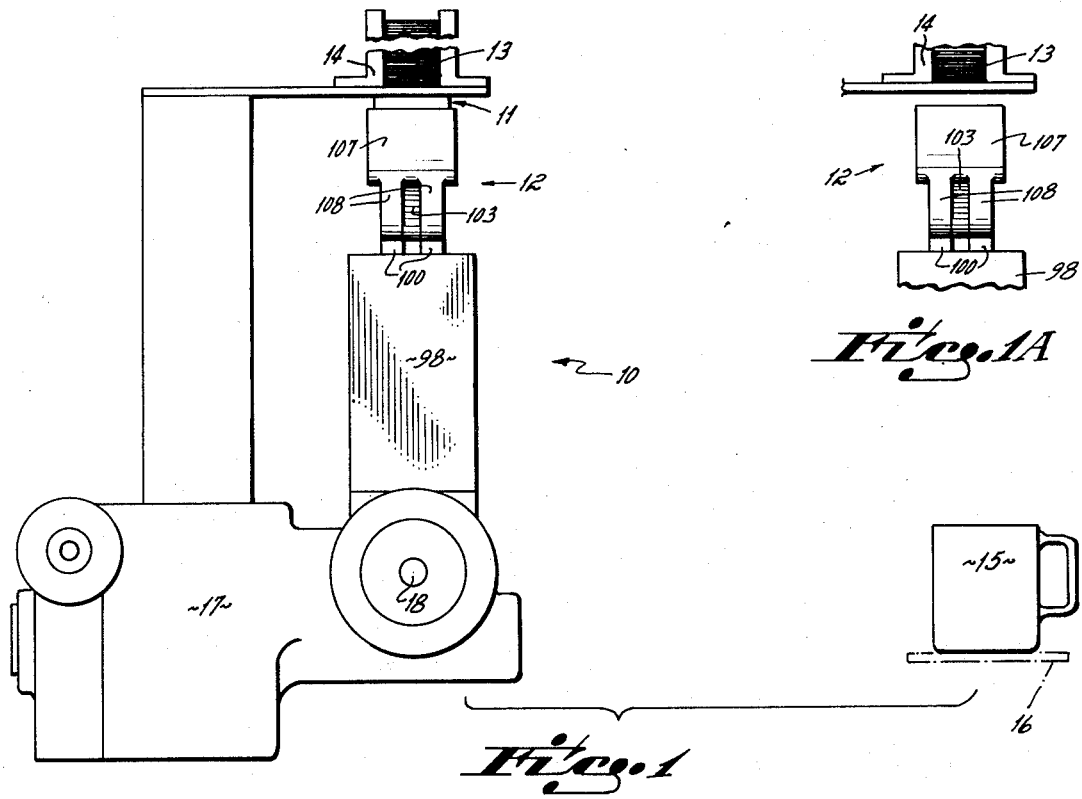
Fig.1
Fig.1A
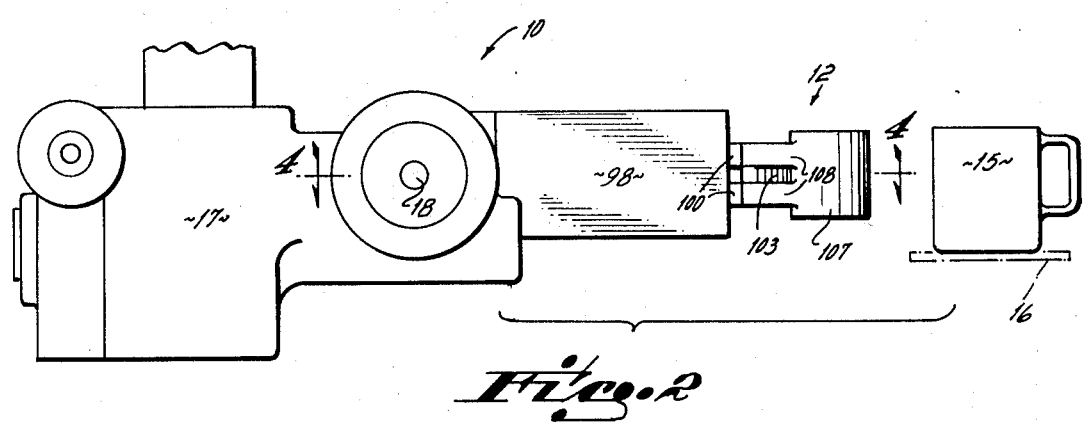
Fig.2
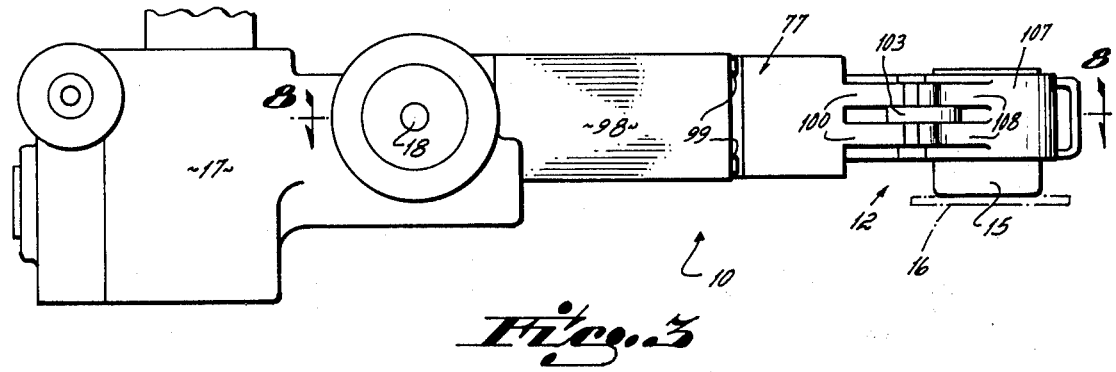
Fig.3

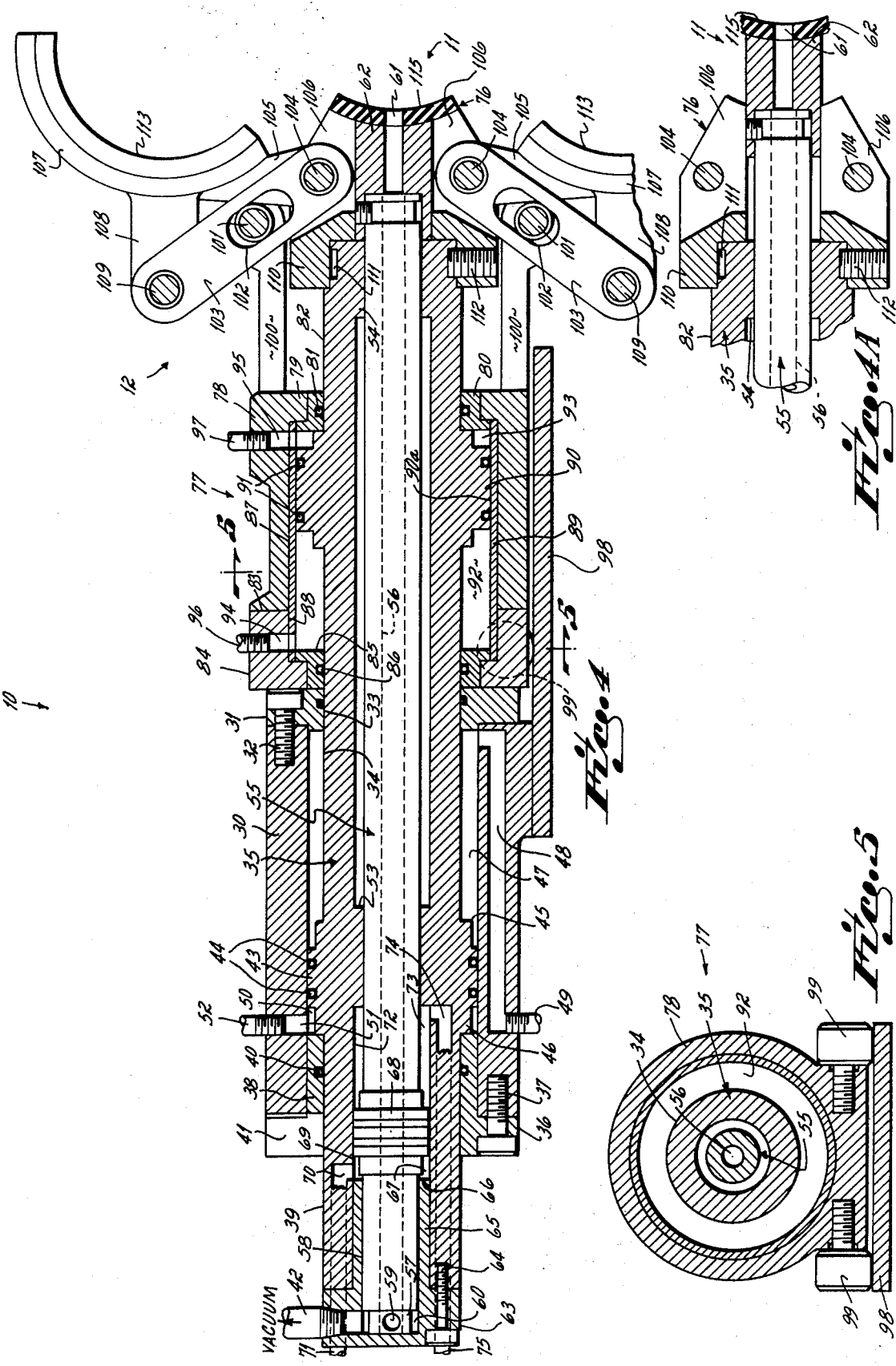

WRAP AROUND DECORATION APPLYING APPARATUS

The present invention relates to an apparatus for decorating articles such as cups, mugs, drinking glasses, or other articles having a generally cylindrical, conical or rounded outer sidewall surface. The invention is an improvement on the structure of my earlier U.S. Pat. No. 3,031,370, titled "Method and Means for Decorating Glass," and is a further improvement on the structure of my later U.S. Pat. No. 3,130,107, entitled "Means for Decorating Glass Articles."

This invention was made in connection with the application of decoration in the form of decals, to articles which are made of glass, and for that reason it is described herein primarily in relation to the application of decals to glass articles or mugs. However, it should be understood that this is by way of illustration and not limitation.

When such a glass article leaves the glass making machine, it is fire polished or glazed and is then moved through a cooling tunnel. After it has been sufficiently cooled, the article is placed in a decorating machine where the decoration is applied. The article then goes through a lehr in which it is annealed.

The decoration may be a decal comprising a backing sheet and a color or design layer adhered thereto. The design is commonly a ceramic design so as to fuse with the article being decorated. On the side of the design opposite that adhered to the backing sheet, a suitable heat effective adhesive is applied which permits the decal to be adhered to the article. The heat also releases the design from the backing sheet, therby permitting the backing to be blown off or otherwise removed. Such decals are commonly known as "thermal release" decals.

My first mentioned patent describes decorator apparatus which utilizes an applicator arm that swings downwardly in an arc. A picker head removes a decoration from a supply, moves in the path of the swinging arm, and transfers the decoration to the applicator arm which, after the picker head is withdrawn, continues its downward swing to apply the decoration to the sides of the article.

The second mentioned patent relates to an improved decorating machine with an interconnected decal picker and applicator. It eliminates the transfer of the decal from the picker to the applicator, which the first mentioned patent required. In accordance with the later patent (the disclosure of which is incorporated by reference herein) the decals are supplied as a stack in a holder which has an opening at the bottom. An applicator on the decorating machine is pivotally mounted adjacent the holder, and is movable between retracted and extended positions. A picker is movable within the applicator from a retracted position flush with the applicator head, to an extended position. A decoration is obtained or "picked" by rotating the applicator to a position in alignment with the holder and extending it to a position adjacent the opening in the bottom of the holder. The picker is moved through the bottom opening and into contact with the lowermost decoration, and grasps the decoration by vacuum. The picker plunger is then retracted to remove the decoration from the holder and the applicator (including the picker) is rotated to a decoration-applying position adjacent the article and is extended into contact with the article to apply the decoration to it. The head has a curved surface conforming to the curvature of the article surface, but the device cannot apply a decoration around more than one-half of the article outside surface. With the mechanism illustrated in U.S. Pat. No. 3,130,107, in order to apply decoration over an arc of more than 180°, it is necessary to employ two separate, opposed, applicator mechanisms.

Humphrey U.S. Pat. No. 2,536,182, issued Jan. 2, 1951, shows apparatus for applying cover pieces to tennis balls. The patent discloses articulated hands for wrapping portions of the cover about opposite sides of the ball core, but no mechanism is provided for extending the hands to bring them into a predetermined starting position with respect to a free standing ball core, and the core must be placed directly between the hands before the covering operation can be started.

Ermold U.S. Pat. No. 923,501, issued June 1, 1909, discloses a bottle-labeling machine in which opposed rubber flaps "wipe" a label onto the bottle surface, as they are moved past the sides of the bottle on opposite sides thereof along paths parallel to the bottle diameter. The patent also shows a bottle neck labeler wherein rollers roll around the neck of the bottle to guide elastic wipers around the neck.

Carter U.S. Pat. No. 3,108,033, issued Oct. 22, 1963, shows apparatus for applying wrap-around labels, wherein pads shaped in conformance with the article are brought into engagement with it from opposite sides thereof. The pads are operated to carry out the wrap-around movement by a separate reciprocable cam, which is advanced into contact with rollers at their outer ends from the opposite side of the article. No means are shown for operating the pads from the shaft on which they are mounted.

The present invention is an improvement over the aforesaid prior patents. It has had as its primary object the provision of apparatus for decorating an article wherein the decoration is grasped by an applicator, carried to and positioned at the article by the applicator, and applied by clamping it around more than half of the outer periphery of the article, all from the same side of the article. The invention contemplates apparatus having a portion for obtaining a decal from a supply, carrying the decal to the article to be decorated, and an associated portion for automatically wrapping the decal around the article. Advantageously, the wrap around or article encircling apparatus does not require any structure on the remote side of the article to complete the wrap around of the decal on that part of the article.

The foregoing objects, features and advantages are achieved by apparatus having a decoration holding means which may include a picker, and presenting a surface corresponding to a portion of the article. The holding means are adapted to hold the decoration on the said surface, prior to its adherence to the article. First moving means moves the holding means to an extended position, at which it positions the decoration in contact with the article, and a retracted position remote from the article. Wrapper means are provided having a surface which is shaped to fit the article surface adjacent to that served by the holding means. The wrapper means are pivotally connected to the holding means, and move with it between the extended and retracted positions. The wrapper means can be swung with respect to the holding means from an open position, in which the surface of the wrapper means is remote from the surface of the article, and a closed position thereby to bend around the article a decoration held at the holding means. A second moving means is connected to the wrapper means and moves with the holding means between the extended and retracted positions. It is operative when energized to swing the wrapper means between the open and closed positions.

A thermally activated decal is normally used, and, upon contact with a heated article such as a recently formed, still hot, molded glass article, the decal will adhere to the article and will be released by the picker. The wrapper means are then withdrawn from the article surface, followed by the withdrawal of the decoration holding means, leaving the decoration on the article and the backing still in place around the article. The heat of the article softens the adhesion between the decoration and the backing sheet, which permits the backing sheet to be blown off or otherwise removed.

The foregoing objects, features and advantages of the present invention will become more clear from the following detailed description of a preferred embodiment shown in the accompanying drawings which form a part of this specification, wherein:

FIG. 1 is an elevation of the decoration applying apparatus, with the decal picker extended and in contact with a decal in the decal hopper;

FIG. 1A shows a segment of the decoration applying apparatus with the picker retracted;

FIG. 2 is an elevation showing the decoration applying apparatus in relation to the article which is to be decorated, following "picking" and prior to the decal application and encircling operation;

FIG. 3 is an elevation of the apparatus with the decal applying mechanism encircling the article;

FIG. 4 shows a horizontal section taken along line 4—4 of FIG. 2;

FIG. 4A is a fragmentary section of apparatus as shown in FIG. 4, but with the picker plunger extended;

FIG. 5 is a transverse sectional view taken along line 5—5 of FIG. 4;

Figure 6:
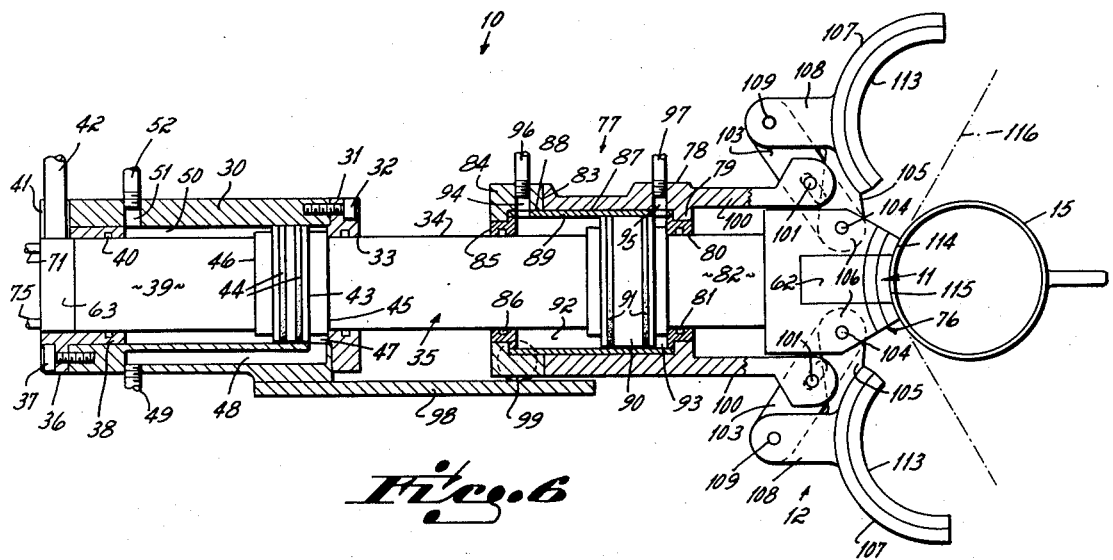
FIG. 6 shows a vertical sectional view of the applicator assembly with the decal partially contacting the article.
Figure 7:
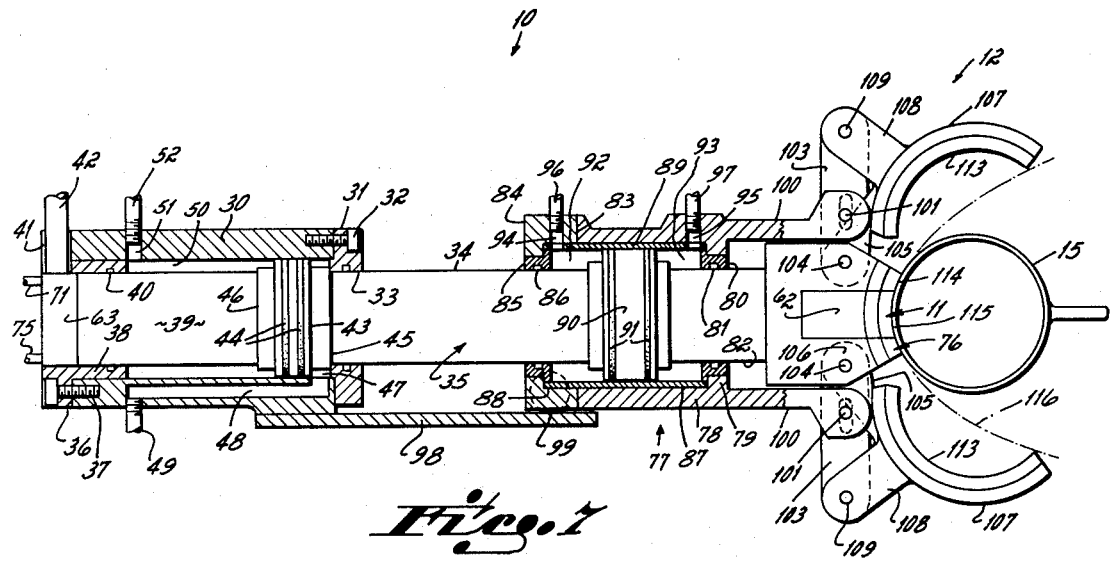
FIG. 7 is similar to FIG. 6 but shows the decal applicator mechanism with the encircling means partially encircling the article.

Referring now to FIG. 1, the decoration applying apparatus is shown with the applicator, generally at 10, in position to grasp or pick a decoration from a supply. (The term decoration is broadly meant to include paper labels and the like, as well as decals.) The decorations are supplied in flat flexible sheet form and in the case of decals typically will have a paper backing. The picker 11 is shown in FIG. 1 extending vertically from the applicator head 12 to contact the bottommost decal of the stack 13 in hopper 14. By a means to be described later, the picker will remove a single decal from the stack 13, after which it is retracted to the applying head 12. The fragmentary view in FIG. 1A shows the applicator after the picker 11 has been retracted into the applying head 12.

Disposed in spaced relation to the machine frame 17 is an article support means 16 which may be a fixed surface, a conveyor or a rotatable table similar to that shown in my prior U.S. Pat. No. 3,130,107. Resting on the upper surface of the article support means 16 is a round or curved article 15 upon which the decoration is to be placed. The article 15 may be positioned on the table in a jig or held by a chuck, not shown. While the article 15 is shown as a mug having vertical side walls of uniform curvature, the applicator 10 is adaptable to permit the application of a decoration onto articles having non-vertical side walls, such as cups, bowls, drinking glasses, as well as to articles with non-uniform curvature. It will also be clear to those skilled in the art that other irregularly-shaped articles can be decorated by apparatus embodying the invention.

The applicator 10 is rotationally mounted to the machine frame 17 about a horizontally disposed axle or pin 18. The applicator is rotated about axle 18 by power driving means (not shown) such as a motor, a rack and pinion gear combination, or any other conventional mechanical movement adapted to provide such motion. Rotating mechanism suitable for this purpose is shown in U.S. Pat. No. 3,130,107, to which reference may be had. When the applicator 10 is horizontally disposed (FIG. 2), the applying head 12 is aligned with the mug 15 so that, upon extension, the applying head 12 will project around the mug 15 (FIG. 3).

To pick up the decal from the supply, the applicator 10 is positioned as shown in FIG. 1. Picker 11 is extended from applying head 12 so that the upper surface of the picker 11 contacts the lower surface of the bottommost decal in the decal stack 13. The picker, by a vacuum means later to be described, withdraws one decal from the decal stack 13, and the picker 11 is retracted into the applying head 12.

When a decal has been removed by the picker 11, the applicator 10 is rotated into a horizontal position as shown in FIG. 2. The applying head 12 is then extended toward mug 15 and the encircling members encircle the mug 15 so that the picker-held decal will be wrapped around the sidewall of mug 15. If the mug 15 is heated and the decal is of the thermal releasing type, a decoration will be placed on the mug 15 when the applying head encircles the mug.

After the decoration has been applied to the surface of the mug 15, the applicator head 12 is retracted and the applicator 10 is returned to its vertically disposed position permitting the apparatus to repeat the decoration-applying sequence for another article.

Referring now to FIG. 4, a horizontal sectional view of the decal applicator is shown. The applicator includes an outer sleeve or first cylinder 30 that is mounted to frame 17 for rotation about axis 18 with respect to it, and comprises a hollow, substantially cylindrical body 30 for supporting the movable elements of the applicator. An annular cap or plate 31 is secured to the forward end of the outer sleeve 30 by screws 32. The inner surface 33 of plate 31 is substantially cylindrical in shape and provides a sliding contact with the outer surface 34 of a centrally located cylindrical portion of applicator head support means comprising a shaft or head-carrying member 35.

A rearwardly disposed annular end plate or cap 36 is secured to the end of outer sleeve 30 by screws 37, and has an annular skirt portion 38 with an outer surface supporting the inner surface of the outer sleeve 30. The inner cylindrical surface of the rear annular end plate 36 and the annular skirt portion 38 contact the outer cylindrical surface 39 of the rearmost portion of the head-carrying member 35. On the inner surface of the skirt 38 is an annular groove into which an O-ring or sealing ring 40 is seated to provide a seal between the inner surface of the skirt 38 and the outer surface 39 of the head-carrying member 35. Advantageously, a slot or cut-out 41 is provided in the rear annular end plate 36 in a location which permits the vacuum line 42 to enter the cut-out 41 when the head-carrying member 35 has moved to its rightmost or extended position (see FIG. 6).

The head-carrying member 35 includes a cylindrical first piston 43 that slides inside outer sleeve or first cylinder 30. Two annular grooves are provided in piston 43 and contain piston rings 44 for sealing with sleeve 30. Piston 43 has associated therewith a cooperative forward stop 45 and a rear stop 46, each stop having a larger circumference than the shank 34, 39 of member 35, but also smaller than the inside diameter of outer sleeve 30.

A substantially cylindrical variable volume pressure chamber 47 is defined between piston 43, the forward annular plate 31 and sleeve 30. This chamber 47 communicates through a bore 48 with flexible pressure line 49 that is secured to the fixed outer sleeve 30 and which provides a passage for inlet or release of pressure air to chamber 47.

A second pressure chamber 50 is located between the fixed outer sleeve 30 and skirt 38, and communicates with a radial bore 51 to which a flexible pressure line 52 is connected.

Picker 11 includes a tip or head 62 mounted on a lineally movable picker-carrying member 55. The head-carrying member 35 is hollow (see FIG. 4), and has two axially spaced inwardly projecting annular flanges 53 and 54, each having an inner diameter substantially equal to the outer diameter of the picker-carrying member 55. The latter is a tubular member having a bore 56 extending along its central axis from one end to the other. Member 55 is disposed for sliding movement through the annular flanges 53 and 54.

The rearmost end of the picker-carrying member 55 includes a neck 57 of a diameter smaller than the diameter at 58 of the picker-carrying member 55. A radial bore 59 communicates between the air chamber 60 which surrounds neck 57 and the bore 56, permitting air to be drawn through the forward orifice 61 in the picker tip 62, through the bore 56 which communicates with orifice 61, through the bore 59, into chamber 60 and out through the flexible tube 42 to an external vacuum source (not shown).

The rearmost end of the head-carrying member 35 has an end plate 63 which is secured to it by screws 64. The end plate 63 has an annular collar or skirt portion 65 with an inner diameter substantially equal to the outer diameter of the picker-carrying member 55. The forward end 66 of collar 65 forms one wall of pressure chamber 67, and the piston 68 and the inner surface 69 of the head-carrying member 35 form the remaining sides of chamber 67. A bore 70 communicates with chamber 67 through the body of head-carrying member 35 and is connected to a conduit 71 at the end plate 63.

A third pressure chamber 73 is located between the forwardmost edges of piston 68, the inner surface 72 of the head-carrying member 35, and the outer surface of the picker-carrying member 55. A passage 74 communicates between chamber 73 and a flexible line 75, passing through the end plate 63 and the body of the head-carrying member 35.

Located between the outer end of the decoration holding means shown generally as 76 and outer sleeve 30 is a slidable sleeve or movable second cylinder element shown generally as 77. The slidable sleeve 77 comprises a substantially cylindrical body 78 with an inwardly projecting flange portion 79 that abuts and carries a forward annular sealing ring 80. The sealing ring 80 has an annular groove in which an O-ring or sealing ring 81 is located to provide a sealing contact between the sealing ring 80 and the outer surface 82 of the head-carrying member 35.

Another ring-like member 84 is secured to the cylindrical body 78 at the rear edge 83 thereof. Inwardly abutting the ring-like member 84 is a rear sealing ring 85 which is also provided with an annular groove in which an O-ring or sealing ring 86 is positioned to provide a sealing contact between the sealing ring 85 and the outer circumference 34 of the head-carrying member 35.

The inner surface 87 of the cylindrical body 78 forms a coextensive surface with the inner surface 88 of the ring-like member 84, permitting a cylindrical sleeve 89 to be telescoped therein with its outer surface contacting the coextensive inner surfaces 87 and 88.

A second piston 90 is provided on the head-carrying member 35 and has an outer cylindrical surface 90a which is in sliding contact with the inner cylindrical surface of the cylindrical sleeve 89. The outer surface 90a is provided with two annular grooves in which piston rings 91 are positioned to provide a sliding seal between the piston-like region 90 and the cylindrical sleeve 89.

Sleeve 77 and piston 90 cooperate to provide two pressure chambers 92 and 93. A first bore hold 94 extends through the ring-like member 84 and cylindrical sleeve 89 to communicate with chamber 92. A second passage 95 passes through the cylindrical body 78 and sleeve 89 to communicate with chamber 93. Flexible pressure lines 96 and 97 are connected to bores 94 and 95, for applying and releasing of pneumatic pressure in the two chambers.

The applicator is provided with guide means in the form of a forwardly extending stabilizing plate 98 which is rigidly secured to outer sleeve 30. A pair of wheels 99 (see FIG. 5) are mounted to sleeve 77 and are positioned in rolling contact with the stabilizing plate 98. The spaced wheels in rolling contact with the stabilizer plate 98 maintain a fixed angular orientation of sleeve 77 with respect to the longitudinal axis of the applicator.

A pair of longitudinally extending arms 100 are rigidly secured to the cylindrical body 78. Near the forwardmost end of each arm 100 a slide or cam pin 101 extends perpendicularly from the arm, and passes through an elongated slot 102 in a lever 103. At one end of each lever 103, a pin 104 passes through an arm 105, and is secured to a head member 106. The pin 104 provides a pivotal connection about which the lever 103 and arm 105, and the means attached to them, can turn with respect to the head-carrying body.

Each encircling member or wrapper means 107 is rigidly secured to arm 105, and has a second rearwardly extending arm 108 for interconnecting with lever 103 by a pin 109 which permits relative rotation between the arm 108 and the lever 103 about the axis passing therethrough.

The head member 106 has a flange portion 110 with an inner surface conforming to the forward end surfaces of the head-carrying member 35. An annular groove 111 is provided in the end surfaces of the head-carrying member 35 to permit a set screw 112 to lock the head-carrying body 106 to the head member 35.

Wrapper means 107 has a high temperature rubber cushion or pad mounted to it for holding the decoration in engagement with the article. The forward face or surface 113 of each wrapper pad 113, as well as the forward surface 115 of picker tip 62, are shaped to conform to the corresponding portions of the outer surface of the article which is to be decorated. These elements are removable, and the applicator apparatus shown in FIG. 4 is thereby adaptable for the application of decorations to articles of other shapes than shown. It can be seen that each member 107 may have a curvature up to almost one-half the circumference of the article 15.

While the foregoing detailed description has referred to a preferred embodiment of the invention, a broader understanding of the invention will be achieved through the following detailed description of the applicator operation. When the applicator 10 is in its vertical position as shown in FIG. 1, the picker carrying member 55 is operated to extend picker tip 62 from head member 106, into contact with the decal at the bottom of stack 13. This is accomplished by applying pressure air to the picker moving means. Pressure is applied through line 71 into chamber 67, thereby causing the picker-carrying member 55 to be moved along its longitudinal axis through and relative to the head-carrying member 35. As this movement occurs, air on the other side of piston 68 in chamber 73 is exhausted through the bore 74. The picker tip 62 is thus extended from the head member 106 a distance permitting it to contact the bottommost decal on stack 13 (see FIG. 4A). The end of tube 42 is connected to a vacuum source, and air is drawn through the forward orifice 61, bore 56 and into the line 42. This movement of air will draw the bottommost decal on stack 13 into contact with the forward surface 115 of the picker tip 62, and external air pressure will thereafter hold it there. By subsequently applying pressure air to chamber 73, and venting pressure in chamber 67, the picker tip 62 (with the decal carried against the forward surface 115) will be withdrawn into the head member 106 until it is disposed as shown in FIG. 4.

After the applicator 10 has been rotated into its horizontal position as depicted in FIG. 2, picker tip 62 and head member 106 are moved into contact with the article 15 to which the decal 116 is to be applied (FIG. 6). This relative movement is achieved by movement of the head-carrying member 35 with respect to outer sleeve 30. By applying pressure through line 52 into chamber 50, wherein it acts on piston 43, and venting pressure from chamber 47 through the line 49, the head-carrying member 35 is extended. As member 35 moves outwardly from sleeve 30, the forward face of piston 90 abuts sealing ring 80, and thereby pushes sleeve 77 forward with it, to the position shown in FIG. 6. At this point the decal 116 is partially in contact with the mug 15. By reason of the action just described, the picker tip 62 and head member 106 together comprise decoration holding means, in that they hold the decoration while it is carried to the article, and hold it on the surface of the article prior to and during wrapping. The first piston 43 and sleeve 30 comprise first moving means, for moving the holding means between the retracted position of FIG. 2 and the extended position of FIG. 6.

At this point the wrap around operation is commenced. By applying pressure through line 97 into chamber 93, and venting chamber 92 through line 96, a reaction force moves the slidable sleeve or second cylinder 77 in a forward direction relative to piston 90 and member 35, from the first position of FIG. 6 to the second position of FIG. 8. This forward motion is transmitted by arms 100 to the linkage comprising elements 103, 105 and 108, causing the encircling members or wrapping means 107 to be rotated or swung about axes through the respective pins 104, and thereby to be moved from the open position shown in FIG. 6 to the closed position of FIG. 8. The second piston 90, second cylinder or sleeve 77, and associated chambers comprise second moving means, for moving the wrapper means about the pivots 104, between its open and closed positions. The decal 116 is, consequently, smoothly wrapped around the mug 15. When chamber 93 has expanded to maximum volume, the encircling member 107 will encircle the article 15, except at the handle (FIG. 8), so that the decal 116 is in smooth intimate contact with the outer surface of the article. After complete contact is made, vacuum in the forward orifice 61 of picker tip 62 is released. Assuming that the article is at the proper temperature (typically about 250° F.), a thermal release decal 116 will transfer from its backing to the outer surface of the mug 15, when the decal 116 has been smoothly wrapped around the mug 15 with the applicator in the position shown in FIG. 8.

It will be noted that the mug 15 has a handle thereon, and that the wrapper means 107 therefore do not completely encircle the mug. However, an article without a handle can be decorated with a completely encircling decoration by installing a different pair of encircling arms 107, shaped to conform to the article surface.

Figure 8:
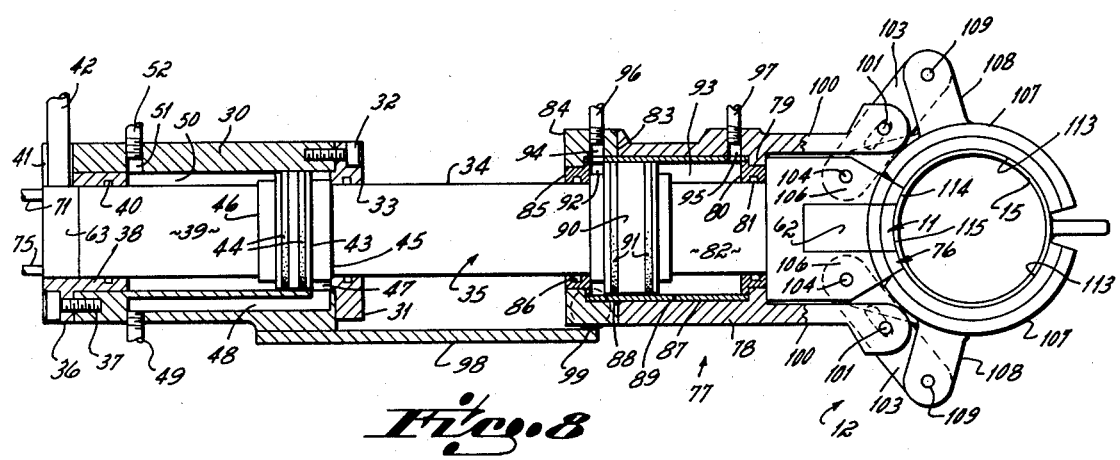
FIG. 8 shows a vertical sectional view taken along line 8—8 of FIG. 3 and shows the article encircling means holding the entire decal against the external peripheral surface of the article.

The apparatus is then reversely operated to disengage head 76 from article 15 by pressurizing chamber 92 and exhausting chamber 93, in order to swing the encircling members 107 from the closed position of FIG. 8 to the open or non-encircling position of FIG. 6. The head-carrying member 35 is then retracted from the position shown in FIG. 6 to that of FIG. 4, by pressurizing chamber 47 and exhausting the chamber 50. The paper backing is blown off or otherwise removed from the decorated article.

The operations described above which are achieved by pressurizing and exhausting of various chambers are controlled and timed by conventional apparatus not shown, such as a plurality of cam-activated valves in the various gas carrying lines. Such conventional timing and control means are within the skill of the art and are not here described.

While the foregoing detailed description of the decoration applying apparatus has been made with particular emphasis upon a preferred embodiment, it will be readily apparent that modifications in form may be made without departing from the spirit and scope of the present invention. Such modifications in form will be apparent to those of skill in the art from the foregoing description.

What is claimed is:

1. Apparatus for applying a decoration to the surface to a curved article, comprising:
    an applicator head,
    a picker for holding said decoration prior to application thereof to said article, said picker mounted for sliding movement relative to said applicator head,
    picker moving means for moving said picker between an extended position with respect to said head, whereat said picker extends beyond said head, and a withdrawn position whereat said picker abuts said head,
    a first piston, said first piston being slidable in a first cylinder and having a shaft connected for moving said head and picker between a withdrawn position whereat said head is spaced from the article to be decorated, and an extended position whereat said head and picker are proximate to the article to be decorated,
    a second piston connected to and moving with said shaft, said second piston mounted to said shaft between said first piston and said head,
    said second piston moving said second cylinder with it when said first piston is moved to said extended position,
    a second cylinder, slidable with respect to said second piston,
    wrapper means swingably mounted to said head and swingable between an article nonengaging position and an article encircling and engaging position,
    means connecting said second cylinder to said wrapper means, movement of said second cylinder on said second piston in one direction swinging said wrapper means into said article nonengaging position and movement of said second cylinder on said second piston in an opposite direction swinging said wrapper means into said article encircling and engaging position.

2. The apparatus of claim 1 wherein said second cylinder comprises a movable sleeve surrounding said second piston, said sleeve connected to said wrapper means to effect the swinging movement thereof by reaction force when pressure is applied to said second piston.

3. The apparatus of claim 2 wherein the said sleeve is connected to said wrapper means by a lever linkage.

4. The apparatus of claim 1 which includes a second wrapper means, positioned on an opposite side of said head from the first mentioned wrapper means.

5. The apparatus of claim 4 wherein the two wrapper means together encircle more than 180° of the outer circumference of said article when in said article encircling and engaging position.

6. The apparatus of claim 1 wherein said picker is centrally mounted within said head, said picker being extensible from said head to obtain a decoration from a supply.

7. The apparatus of claim 1 which further includes guide means preventing rotation of the head with respect to the article to be decorated.

8. The apparatus in claim 1 wherein said picker includes a surface with an orifice therein communicating with a vacuum source, the said surface conforming to the shape of the article being decorated.

9. The apparatus in claim 1 wherein said wrapper means includes an arm pivotally connected to said head,
    a lever is swingably connected at one end to said wrapper means and at another end to said head,
    a lever is swingably connected at one end to said wrapper means and at another end to said head,
    and said second cylinder is connected to said lever for camming the latter about said head.

10. The apparatus of claim 1 wherein said picker moving means comprises a piston which is slidably mounted within the said shaft by which the first and second pistons are connected.

* * * * *